United States Patent
Sallavanti et al.

(10) Patent No.: US 6,656,315 B2
(45) Date of Patent: Dec. 2, 2003

(54) VISIBLY TRANSPARENT DYES FOR THROUGH-TRANSMISSION LASER WELDING

(75) Inventors: Robert A. Sallavanti, Dalton, PA (US); Leonard Peter Frieder, III, Clarks Summit, PA (US)

(73) Assignee: Gentex Corporation, Carbondale, PA (US)

(*) Notice: Subject to any disclaimer, the term of this patent is extended or adjusted under 35 U.S.C. 154(b) by 74 days.

(21) Appl. No.: 10/098,919

(22) Filed: Mar. 15, 2002

(65) Prior Publication Data

US 2002/0124952 A1 Sep. 12, 2002

Related U.S. Application Data

(62) Division of application No. 09/711,277, filed on Nov. 10, 2000.

(51) Int. Cl.[7] ............................................. B29C 65/16
(52) U.S. Cl. ............................ 156/272.8; 156/304.6; 156/308.2
(58) Field of Search ........................ 156/272.2, 272.8, 156/304.6, 308.2, 308.4, 309.9

(56) References Cited

U.S. PATENT DOCUMENTS

| | | |
|---|---|---|
| 3,424,890 A | 1/1969 | Van Ruyven |
| 3,705,043 A | 12/1972 | Zabiak |

(List continued on next page.)

FOREIGN PATENT DOCUMENTS

| | | |
|---|---|---|
| DE | 1629225 | 6/1966 |
| EP | 0 159 169 | 10/1985 |
| EP | 0 282 181 A2 | 9/1988 |
| EP | 0483 569 A1 | 5/1992 |
| JP | 8230043 | 9/1985 |
| JP | 62142092 | 6/1987 |
| JP | 6297828 | 10/1994 |
| JP | 9220765 | 8/1997 |
| WO | WO 98/02294 | 1/1998 |
| WO | WO 00/20157 | 4/2000 |
| WO | WO 01/07524 A1 | 2/2001 |

OTHER PUBLICATIONS

By Jones IA and Hilton PA, Sallavanti, R., Griffiths J., "Use of Infrared Dyes for Transmission Laser Welding of Plastics", ICALEO Conference, Nov. 1999.

AVECIA Infra Red Dyes Product Description; http://www.avecia.com/infrared/products.htm, Apr. 27, 2001.

Primary Examiner—Sam Chuan Yao
(74) Attorney, Agent, or Firm—Keusey, Tutunjian & Bitetto, P.C.

(57) ABSTRACT

Selection criteria for dyes that predicts efficiency and performance for plastics welding. A first stage quantitative calculation screens dyes that possess an absorption band that can be matched to a laser that is suitable for plastic welding. It also identifies absorption troughs in the visible spectrum and establishes relationships between the relative optical densities of the absorption band and trough. A second stage quantitative calculation screens dyes for their contribution to the transparency of the substrate. By combining these two stages, the usefulness of a candidate dye can be quickly, easily and inexpensively determined.

14 Claims, 3 Drawing Sheets

U.S. PATENT DOCUMENTS

| | | | |
|---|---|---|---|
| 4,069,080 A | | 1/1978 | Osborne |
| 4,156,626 A | | 5/1979 | Souder |
| 4,424,435 A | | 1/1984 | Barnes, Jr. |
| 4,606,859 A | | 8/1986 | Duggan et al. |
| 4,657,345 A | * | 4/1987 | Gordon ........................ 359/885 |
| 4,879,450 A | | 11/1989 | Valentin et al. |
| 4,892,584 A | | 1/1990 | Chapman |
| 4,906,320 A | | 3/1990 | Powers |
| 4,969,969 A | | 11/1990 | Powers |
| 5,005,926 A | * | 4/1991 | Spielberger ................. 359/359 |
| 5,093,147 A | | 3/1992 | Andrus et al. |
| 5,113,479 A | | 5/1992 | Anderson et al. |
| 5,252,262 A | * | 10/1993 | Patel ........................ 264/1.26 |
| 5,279,693 A | | 1/1994 | Robinson et al. |
| 5,501,759 A | | 3/1996 | Forman |
| 5,833,743 A | | 11/1998 | Elwakil |
| 5,837,042 A | | 11/1998 | Lent et al. |
| 5,843,265 A | | 12/1998 | Grimm |
| 5,893,959 A | | 4/1999 | Muellich |
| 5,897,694 A | | 4/1999 | Woolf |
| 5,990,197 A | | 11/1999 | Escano et al. |
| 6,010,564 A | | 1/2000 | Zhu et al. |
| 6,077,377 A | | 6/2000 | Bentz et al. |
| 6,136,079 A | | 10/2000 | Evans et al. |
| 6,149,719 A | | 11/2000 | Houle |
| 6,174,356 B1 | | 1/2001 | Evans et al. |
| 6,183,549 B1 | | 2/2001 | Wight |
| 6,190,422 B1 | | 2/2001 | Carr |

* cited by examiner

VISIBLY TRANSPARENT DYES FOR THROUGH-TRANSMISSION LASER WELDING

This application is a division of Ser. No. 09/711,277 filed on Nov. 10, 2000.

BACKGROUND OF THE INVENTION

1. Field of the Invention

The invention relates to visibly transparent dyes and a method for using same in through-transmission laser welding. More particularly, it relates to the use of dyes in aesthetically demanding applications.

2. The Prior Art

Many different materials are used as brazing compounds or radiation scattering compounds in plastic welding. Generally the top substrate, through which the radiation is first transmitted before reaching the joint region, is designed to transmit a high portion of the welding radiation.

Brazing compounds are added to the joint region to absorb or scatter the incident radiation to melt the facing surfaces that comprise the joint to be welded. Radiation scattering is an uncontrolled and relatively inefficient method of converting the incident radiation to heat. Accordingly, radiation scattering may require larger amounts of the brazing compound, greater amounts of incident radiation, slower linear welding speeds, and may result in a poor appearance of the final weld.

Other radiation scattering or radiation adsorbing materials may be incorporated into the surface of either substrate at the joint region, or into the entire lower substrate. However, there are no known compounds or welding techniques which can provide predicable results in demanding aesthetic industrial and consumer applications like automobile moldings and food and beverage packaging. A brief description of those known materials and methods follows:

U.S. Pat. No. 4,424,435 employs metal brazing compounds, preferably titanium, but also silicon carbide, beryllium, cobalt, germanium, iron, molybdenum, nickel, niobium, platinum, rhenium, rhodium, tantalum and tungsten. Several severe limitations are inherent in the disclosed methods. First, these metallic brazing compounds are only suitable for welding glass. Second, the patent admits that some experiments with Nd-YAG pulsed lasers have resulted in some nonlinear effects at the weld joint which are not entirely understood.

U.S. Pat. No. 5,843,265 contemplates the use of inorganic materials, such as, but not limited to, pigments, fillers, fibers and reinforcing materials as radiation absorbing compounds. Their preferred embodiment employs a carbon black suspension which necessarily tints the host workpiece to a muddy grey or black. In addition, the use of a polychromatic, non-coherent radiation source requires the presence of cumbersome focusing elements and masks.

U.S. Pat. Nos. 4,156,626; 4,906,320; and 5,501,759 generically refer to printer's ink, carbon black, and aniline dyes; opaque ink and other sufficiently opaque materials; and dark ink or dark polymeric film, respectively.

U.S. Pat. No. 5,893,959 refers to light scattering pigments or glass fibers. In order to hide the presence of the pigments, they prescribe tinting both workpieces to be black and opaque.

The published PCT application bearing International Application Number PCT/GB99/03241 discloses a host of organic dyes and metalated organic dyes such as cyanine dyes, squarylium dyes, croconium dyes, metal phthalocyanine dyes, metalated azo dyes and metalated indoaniline dyes.

The above survey indicates that there are a multitude of options for radiation absorbing compounds. An inordinate amount of experimentation, and expense associated with those rarer compounds, may be required to select a general purpose dye for aesthetically demanding applications. Further confusing the issue are numerous interrelated factors such as host selection and its polymerically related cousins, host compatibility, including solubility, the degree of visibility of the compound, the type and degree of tinting contributed by the dye, if visible, and the related issues of host thickness, and dye concentration as a function of host thickness, i.e. the concentration gradient.

SUMMARY OF THE INVENTION

It is an object of the invention to identify dyes having strong absorption bands above 350 nm.

It is an object of the invention to identify dyes that further have absorption troughs in the visible region.

It is an object of the invention to identify dyes that are also extremely soluble, add little or no light scattering and efficiently absorb laser radiation and via vibronic relaxation transmit heat to weld plastics.

It is an object of the invention to additionally quantify the relative optical densities of the absorption band and absorption troughs.

It is an object of the invention to identify dyes that further strongly transmit light across most or all of the visible spectrum.

It is an object of the invention to identify dyes that also have high photopic transmission values.

It is an object of the invention to provide quantitative means for identifying dyes that meet all of the above criteria.

These and other related objects are achieved according to the invention by providing selection criteria for dyes that predict efficiency and performance for plastics welding. A first stage quantitative calculation screens dyes that possess an absorption band that can be matched to a laser that is suitable for plastic welding. It also identifies absorption troughs in the visible spectrum and established relationships between the relative optical densities of the absorption band and trough.

A second stage quantitative calculation screens dyes for their contribution to the transparency of the substrate. By taking into consideration the results from both stages, the usefulness of a candidate dye can be quickly, easily and inexpensively determined. The key is identifying the most critical parameters that determine a dyes ability to perform in aesthetically demanding welding applications and subsequently discovering ways to rate the dyes and compare them to each other.

BRIEF DESCRIPTION OF THE DRAWINGS

In the accompanying drawings to which reference is made in the instant specification and which are to be read in conjunction therewith and in which like reference numerals are used to indicate like parts in the various views.

DETAILED DESCRIPTION OF THE PREFERRED EMBODIMENTS

Figure 1:
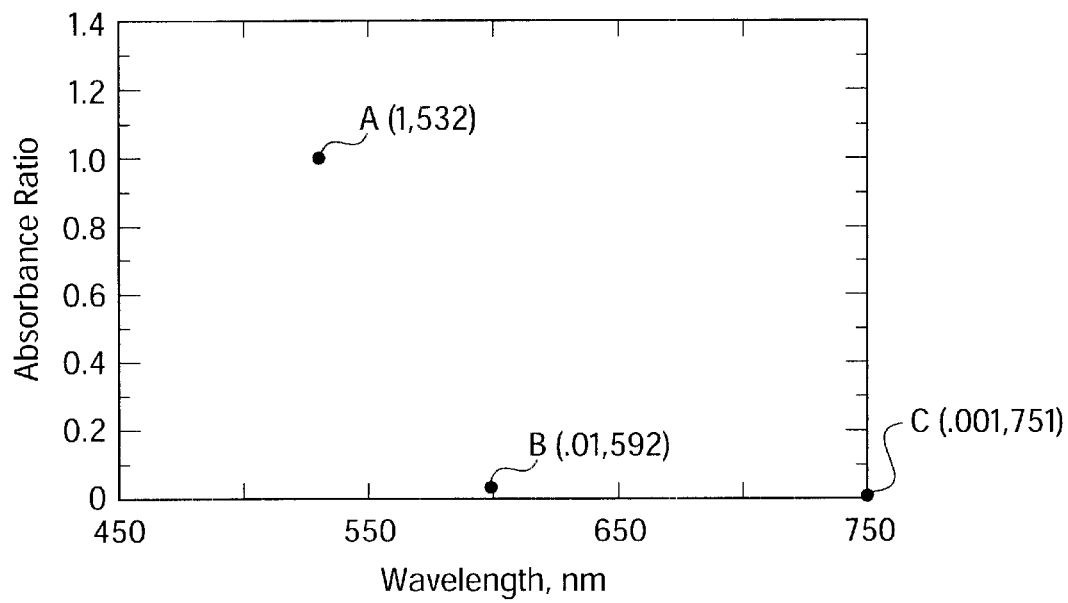
FIG. 1 is a graph showing the Absorbance Ratio points for the wavelengths of interest for the candidate dye of Example 1.

Through transmission welding by various sources of radiation is known. The use of lasers as the radiation source represents a subset of this welding technology. The arrangement of the laser oriented to pass through an upper substrate to the joint is described in detail in U.S. Pat. No. 5,893,959, the contents of which are incorporated herein by reference thereto. Above and beyond the teachings of U.S. Pat. No. 5,893,959, the present invention includes the features of: lasers matched to absorption peaks above 350 nm, for example, Nd:YAG tripled (354), Nd:YAG doubled (532 nm), Argon (488 and 514 nm), Cu vapor (511 and 578 nm), ruby (694.3 nm), HeNe (632.8 nm), Krypton (647 nm), VIS diode (about 600 to 780 nm) and dye lasers (577 to 593 nm); laser absorbing dyes disposed in the upper substrate at the joint region; laser absorbing dyes disposed in a separate film or lamina clamped between the substrates; laser absorbing dyes disposed in the lower substrate at the joint region or throughout all or part of the substrate; substrates selected from a variety of polymers, for example, polycarbonate, polymethylmethacrylate (PMMA), polyamides, and polyesters and films made of these polymers; polyolefin films; transparent substrates including clear, water-white and cosmetically tinted but still transparent substrates; a variety of aesthetically demanding applications; and novel Absorption Ratios to determine dye efficiency and photopic values to determine dye performance.

The dye may be introduced into the joint region in several ways. First, the dye can be incorporated into a thin film. The film is preferably made of the same material as at least one of the substrates. If the film is made from a different material than a substrate, the film should be compatible with, i.e. soluble in, the polymer. The film may contain on the order of one ten-thousandths part dye on a weight basis. The film thickness may be on the order of tens of microns thick. Second, the dye may be incorporated into a surface of either substrate facing the joint via insert molding, dip coating, dye infusion, painting, printing, spraying. The dye may furthermore be incorporated into the entire lower substrate since only the surface facing the joint will be reactive.

Previously it was thought that laser welding wavelengths had to be at least above 800 nm, outside the visible region, in order to be useful in demanding aesthetic applications. The theory was that any absorption bands between 380 nm and 780 nm would strongly interfere with the transmission of visible light resulting in darkly or intensely colored portions by virtue of their dye content. Furthermore, it was thought that incident laser radiation below 380 nm would adversely sever polymeric bonds.

Surprisingly it was discovered that only radiation below 350 nm would adversely affect the polymeric bonds. Even more astonishing was the discovery that laser welding wavelengths in the visible spectrum could be used if the concentration of the dye was balanced against the dye's absorption bandwidth. Applicant has developed a novel two part rating system to measure and balance dye efficiency and dye performance especially for through-transmission laser welding.

Part 1—Dye Efficiency. Dye concentration is a key issue that drives the need for screening and selecting general-purpose dyes usable in a range of concentrations for different applications. Currently in order to assess the effect of different concentrations, a part needs to be reproduced at nominal thicknesses and doped at different levels so that all the reproductions can be tested. This process may have to be repeated for parts of different thicknesses. The expense and required resources for such testing cycles may be commercially unreasonable.

In addition, it can be very difficult to test thin films or lamina because reflections off the front and back surfaces can create interference patterns that obfuscate the dye transmission data or differences between measured films. Furthermore, thicker pieces have another problem in that their own transmission characteristics may mask or overshadow what would otherwise be extremely high transmission bands of the dye. For cosmetically tinted pieces, the transmission characteristics of the cosmetic tint may further mask or overshadow the transmission bands of the dye.

Applicants have developed a measure that they call "Absorbance Ratio" that measures the relative optical density (OD) as a function of wavelength. The Beer Lambert Law, defines the OD at a given wavelength (wv) as $$OD(wv) = c \cdot t \cdot k(wv)$$

where:
c is the molar concentration of the absorber in the host material (mol/L);
t is the path length through the host material (cm); and
k is the molar extinction coefficient of the absorber in the host material at the wavelength in question (L/(mol·cm))

Four separate optical density measurements are used to generate one Absorbance Ratio point at a given wavelength. This Absorbance Ratio uses the dye's absorption band matched to a laser welding wavelength as a reference point, having an optical density of unity, for example. This reference value is then compared to the absorbance troughs in the visible spectrum. Both values subtract out the absorbance due to the substrate thereby making the ratio independent of substrate contribution or interference.

Applicants Absorbance Ratio may be calculated by preparing just two substrate samples of nominal thickness. Sample 1 will be devoid of the dye under investigation (Substrate) and Sample 2 will have the dye incorporated therein at concentration X (Substrate+Dye).

Next, identify a laser wavelength which is within the dye's absorption band. This will serve as the laser welding wavelength (lww) in the denominator of all Absorbance Ratio equations for a given example. Then, plot optical density (OD) as a function of wavelength (wv) as follows in Equation 1:

$$\text{Absorbance Ratio } (OD) = \frac{OD(\text{Substrate} + \text{Dye} @ wv) - OD(\text{Substrate} @ wv)}{OD(\text{Substrate} + \text{Dye} @ lww) - OD(\text{Substrate} @ lww)}. \quad \text{Equation 1}$$

EXAMPLE 1

Calculating the Absorbance Ratio for a Candidate Dye

The substrate was doped with a notch absorber at a concentration of between 0.05 and 0.10 grams per pound of substrate. In this example, the notch includes the 532 nm wavelength of the doubled Nd:YAG laser. Accordingly the laser welding wavelength equals 532 nm (lww=532 nm). This value used in the denominator of Equation 1 will be constant for all calculations with this absorber.

Next we calculate the reference point for our Absorbance Ratio. The reference point by definition has an optical density (OD) of unity. The reference point is where the wv equals lww (532 wv=532 lww) as is calculated in Equation 1-A as follows:

$$\text{Absorbance Ratio }(OD) = \frac{OD(\text{Substrate}+\text{Dye@532 nm}) - OD(\text{Substrate@532 nm})}{OD(\text{Substrate}+\text{Dye@532 nm}) - OD(\text{Substrate@532 nm})} = 1 \qquad \text{Equation 1-A}$$

Note that the Absorbance Ratio will remain at 1 independent of concentration, substrate type, substrate transmission characteristics or substrate thickness. Next we calculate the Absorbance Ratio at a first visible wavelength. As an example we have selected 592 nm, which is input into Equation 1-B as follows:

$$\text{Absorbance Ratio }(OD) = \frac{OD(\text{Substrate}+\text{Dye@592 nm}) - OD(\text{Substrate@592 nm})}{OD(\text{Substrate}+\text{Dye@532 nm}) - OD(\text{Substrate@532 nm})} = .01 \qquad \text{Equation 1-B}$$

Note that at this visible wavelength the Absorbance Ratio is yields an optical density one-hundredth less dense than at the reference point. This is shown graphically as point B on FIG. 1. Optionally, we then calculate the Absorbance Ratio at a second visible wavelength. As an example we have selected 751 nm, which is input into Equation 1-C as follows:

$$\text{Absorbance Ratio }(OD) = \frac{OD(\text{Substrate}+\text{Dye@751 nm}) - OD(\text{Substrate@751 nm})}{OD(\text{Substrate}+\text{Dye@532 nm}) - OD(\text{Substrate@532 nm})} = .001 \qquad \text{Equation 1-C}$$

Note that at this visible wavelength the Absorbance Ratio yields as optical density one-thousandth less dense than at the reference point. This is shown graphically as point C on FIG. 1.

To summarize, the lww A point serves as a reference point having an optical density of 1. Applicants dye efficiency criteria is based on the relative value of point B. In the example, the B point is two orders of magnitude below the reference point. This suggests that the dye transmits fairly well near the middle of the visible spectrum, represented by the B point, yet very efficiently absorbs at the lww. As indicated by the C point, the dye also transmits extremely well at the high end of the visible spectrum.

While the example utilizes a laser welding wavelength in the visible spectrum, it should be understood that other lasers outside the visible wavelength may be selected. Applicants selection criteria is equally valid for near ultra-violet welding between about 350 nm and about 380 nm, for example, with the Nd:YAG tripled at 354 nm. However, it is critical that Equations 1-B, and optionally Equation 1-C, be calculated at wavelengths within the visible spectrum.

EXAMPLE 2

Calculating the Absorbance Ratio for Carbon Black

Figure 2:
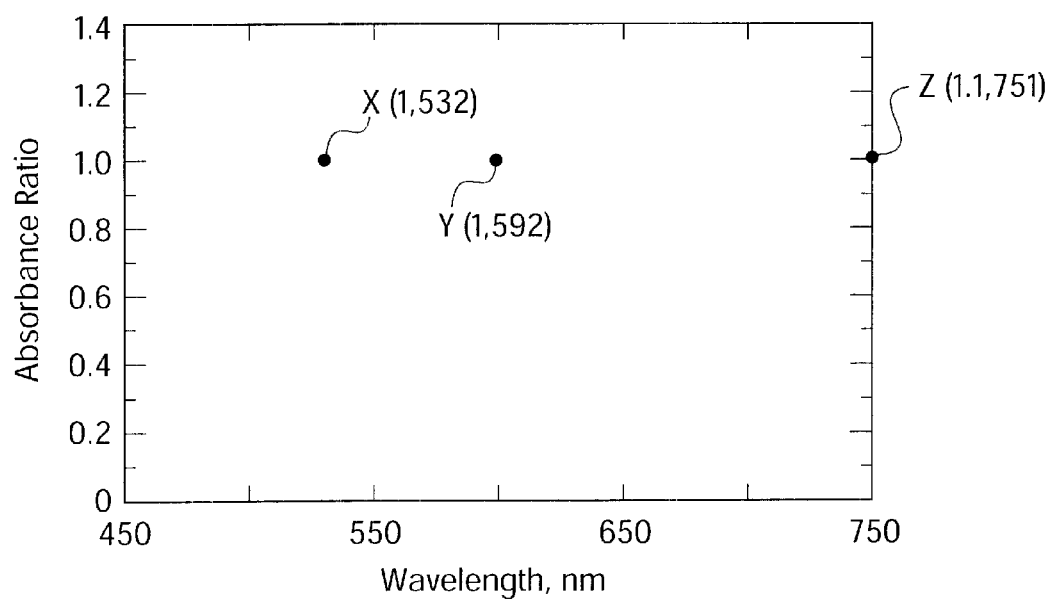
FIG. 2 is a graph showing the Absorbance Ratio points for the same wavelengths of interest for carbon black.

Next we calculate the Absorbance Ratio for a prior art compound, for example carbon black. We use the same reference point of 532 nm for the lww and we use the same wavelengths as above, 532 nm, 592 nm and 751 nm, for the wv value in the numerator. These points as shown as X, Y and Z on FIG. 2. The Absorbance Ratio at the reference point (X) is 1.0. The Absorbance Ratios at point Y is 1.0 and at point Z is 1.1. The following table presents a side-by-side comparison:

| Absorbance Ratios (ref. graph point) | | |
|---|---|---|
| Wavelength | 532 nm Absorber | Carbon Black |
| 532 nm | 1.0 (A) | 1.0 (X) |
| 592 nm | 0.01 (B) | 1.0 (Y) |
| 751 mm | 0.001 (C) | 1.1 (Z) |

Figure 3:
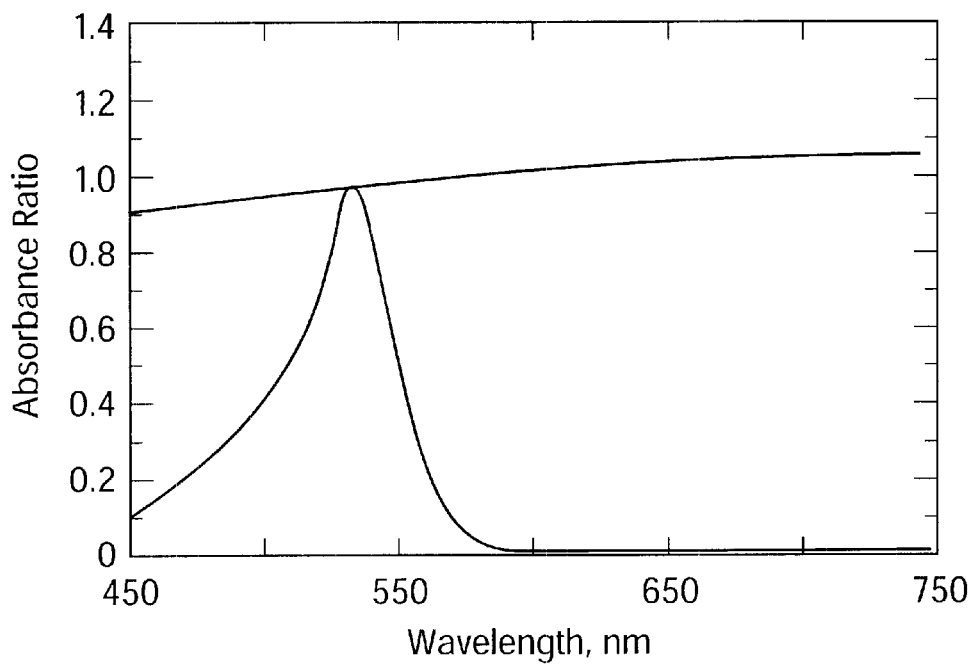
FIG. 3 is a graph showing the complete Absorbance Ratio curves for the candidate dye compared to carbon black.

FIG. 3 shows the full Absorbance Ratio curves for the 532 absorber and carbon black together. This graph readily shows that the 532 absorber effectively absorbs at the desired laser welding wavelength and absorbs 100 times and 1000 times less strongly at other points within the visible spectrum. Carbon black absorbs at about the same strength across the entire visible spectrum. In general we will select dyes that demonstrate this 100-fold difference. The greater the difference, the better the dyes efficiency rating. This is part one of our selection criteria, part two is the photopic value.

Part 2—Dye Performance. The Photopic value is the eye-integrated value of the filter over the visible spectrum as defined by Equation 2 as follows:

$$\text{Photopic Transmission \%} = \frac{\int_{380\ nm}^{780\ nm} T(x) \cdot P(x) \cdot IC(x) \cdot dx}{\int_{380\ nm}^{780\ nm} P(x) \cdot IC(x) \cdot dx} \times 100\% \qquad \text{Equation 2}$$

where:
- T(x) represents the transmission values of the dye in question as a function of wavelength.
- P(x) represents the photopic sensitivity curve as a function of wavelength.
- IC(x) represents the reference light source (typically illuminant C) to which the eye's photopic sensitivity is calibrated as a function of wavelength.

Figure 4:
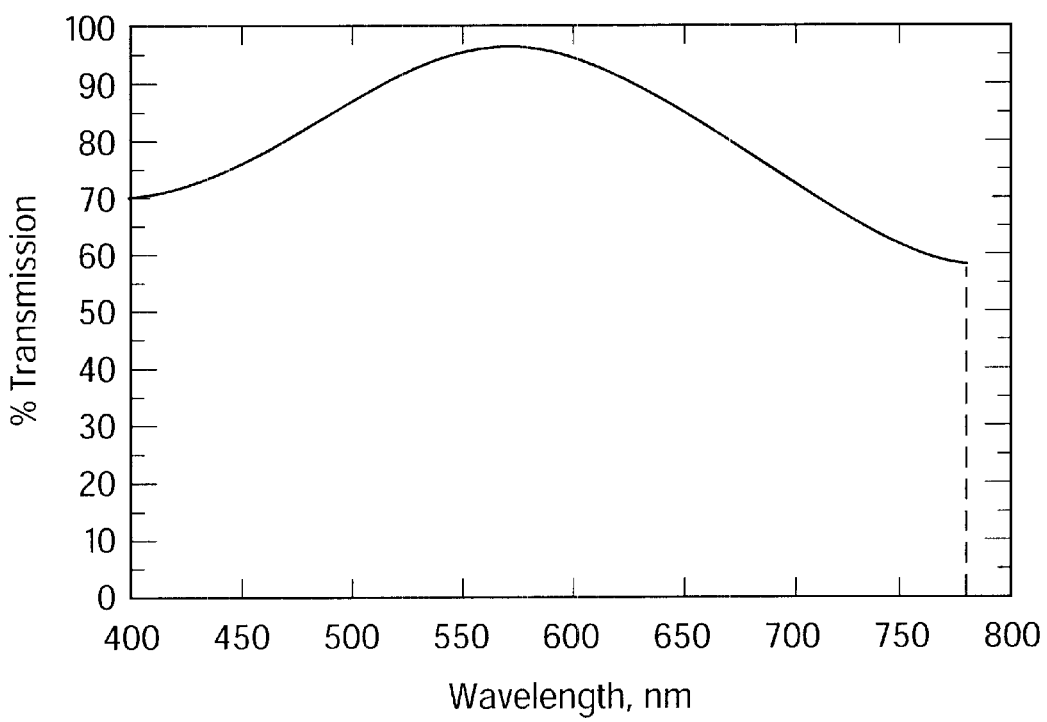
FIG. 4 is a graph showing the photopic curve combined with the illuminant C curve.

FIG. 4 shows the P(x)·IC(x) curve. The area under the curve represents the integral of P(x)·IC(x), i.e. the denominator of Equation 2.

Figure 5:
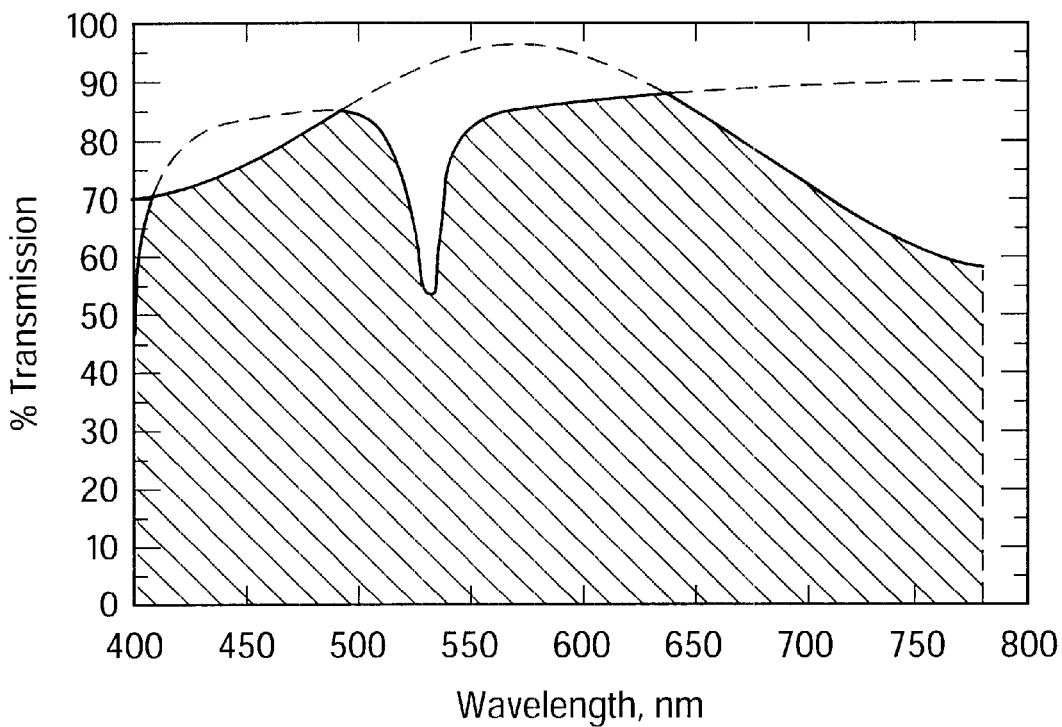
FIG. 5 is a graph combining the transmission curve of candidate dye from Example 1 with the photopic and illuminant C curve of FIG. 4.

FIG. 5 shows the transmission curve for the 532 nm dye overlying the P(x)·IC(x) curve from FIG. 4. The cross-hatched area under the combined curves, represents the numerator of Formula 2 above. In our present example, the area in FIG. 5 is about twenty percent less than the area of FIG. 4. Accordingly, Equation 2 calculates an 80% photopic value for the dye.

Figure 6:
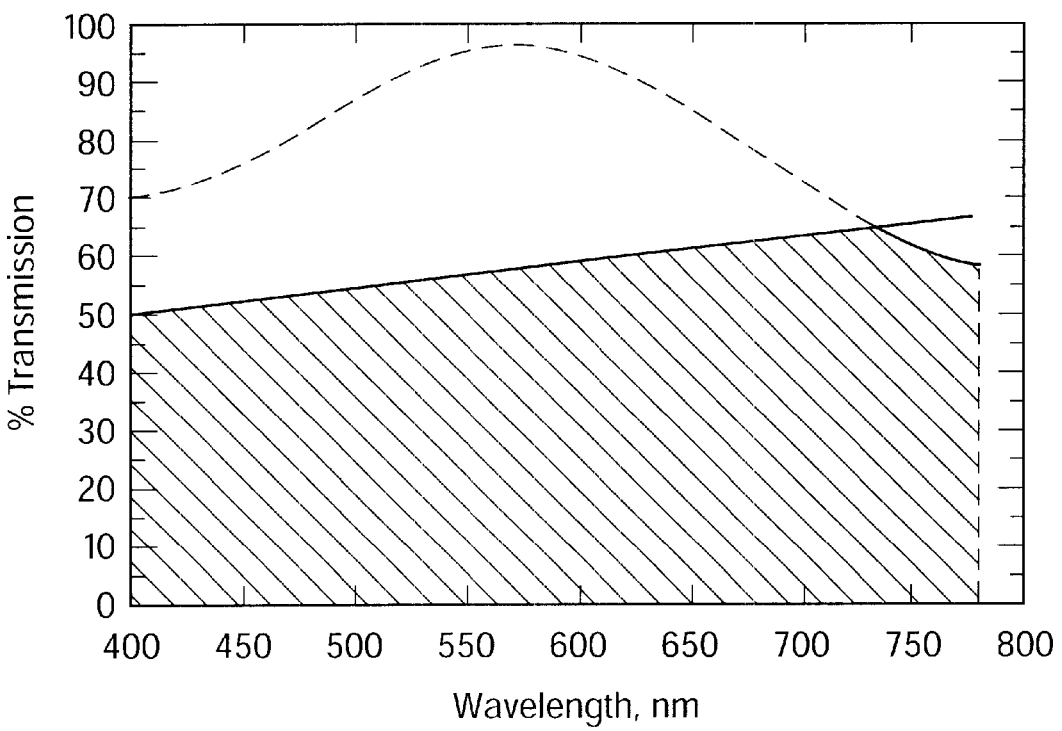
FIG. 6 is a graph combining the transmission curve of carbon black with the photopic and illuminant C curve of FIG. 4.

FIG. 6 shows the transmission curve for carbon black overlying the P(x)·IC(x) curve from FIG. 4. The cross-hatched area under the combined curves, represents the numerator of Formula 2 above. The area in FIG. 5 is about forty percent less than the area of FIG. 4. Accordingly, Equation 2 calculates a 60% photopic value for carbon black.

For the sake of comparison, clear plastic, or more particularly water-white polycarbonate possesses a photopic value of about 88–90% depending on thickness and other factors. Applicants have discovered that for a general purpose dye, a photopic value within 10% of water white is ideal and will likely be unseen by the naked eye. Furthermore, a at slightly higher dye concentrations or dye concentration gradients, a photopic value within 15% of water white is highly desirable and may provide only the slightest hint of color under perfect viewing conditions. Finally, at greater dye concentrations or higher dye concentration gradients, a photopic value within 20% of water white is practical and useful where a light pastel coloration to the lower substrate or joint region is acceptable.

Accordingly, we use high photopic values, within given ranges to water-white as the second performance criteria to evaluate general purpose through-transmission laser welding dyes.

DYE EXAMPLES

Below is an exemplary listing of three classes of dyes that achieved a high rating under the criteria of the invention. Other classes of dyes with favorable ratings may also exist and are included under this invention.

A. The first class of dyes that has both high efficiency and high performance under Applicants rating system is metalloporphyrins. This class is characterized by cyclic planar compounds consisting of four pyrrole rings bridged to each other by methyne carbon atoms and chelated with a metal ion bearing a +2 charge, such as Pt+2, Cu+2, or Zn+2. The candidate dye from Example 1 above is a palladium porphyrin.

B. The second class of dyes that has both high efficiency and high performance under Applicants rating system is metalloazaporphyrins. This class is characterized by cyclic planar compounds consisting of four pyrrole rings bridged to each other by nitrogen atoms and chelated with a metal ion bearing a +2 charge, such as Pt+2, Cu+2, Zn+2, or Pd+2.

C. The third class of dyes that has both high efficiency and high performance under Applicant's rating system is Fischer Base dyes. This class is characterized by indolene molecules comprising a benzene ring fused to a pyrrole ring with the N in a position adjacent to the juncture. A dienyl group is attached at the pyrrole carbon adjacent the N and is terminated with numerous molecular moieties which are conjugated with double bonded structures and with various alkyl substituents on the indolene ring.

In general, candidate dyes would possess high extinction coefficients. Applicant's rating system then provides a quantitative way to measure whether those candidate dyes also possess a sufficiently low Absorbance Ratio within the visible spectrum as well as sufficiently high photopic values for the welding application in question.

As recited in the claims, a fraction means less than one-half. The word transparent means that images transmitted through a substrate are clearly discernable without linear or spatial distortion. Transparent includes clear or water-white plastic panels. Transparent also includes plastic panels which are lightly pastel tinted but do not distort the shape or relationship of images, like lightly tinted portions of automobile windows.

What is claimed is:

1. A method for transmitting a laser beam at a laser welding wavelength through an upper region of a first substrate to a joint region that upon assembly includes a first welding surface of said first substrate and a second welding surface of a second substrate and a laser absorbing section comprising the steps of:

providing an upper region which is highly transmissive of the laser welding wavelength;

selecting a dye with (i) an absorption band above about 350 nm that includes the laser welding wavelength, (ii) an absorption trough in the visible spectrum, (iii) strong transmission of light within the visible spectrum;

dissolving the dye into the laser absorbing section, said dye being very soluble in the plastic so that it makes little contribution to the light scattering characteristics of the plastic and said dye efficiently absorbing the laser radiation and via vibronic relaxation transmitting heat to weld the plastics; and assembling all parts of the joint region together and transmitting the laser beam through said upper region to the laser absorbing section to heat and weld said welding surfaces together, wherein said selecting step comprises the step of quantitatively calculating an Absorbance Ratio of a candidate dye that yields optical density as a function of wavelength (wv) relative to a reference wavelength, the Absorbance Ratio is defined by the following equation $$\text{Absorbance Ratio } (OD) = \frac{OD(\text{Substrate} + \text{Dye}@wv) - OD(\text{Substrate}@wv)}{OD(\text{Substrate} + \text{Dye}@lww) - OD(\text{Substrate}@lww)}$$

where lww is the reference wavelength, and the optical density is one of $1/100$ or $1/1000$ less dense than a reference point.

2. The method of claim 1, wherein the strong transmission of light is across most of the visible spectrum.

3. The method of claim 1, wherein the absorption band is outside the visible spectrum whereby the strong transmission of light is across the entire visible spectrum.

4. The method of claim 1, wherein the strong transmission of light in the visible spectrum comprises a high photopic value for the dye.

5. The method of claim 4, wherein the photopic value of the plastic containing the dye is less than about 10% lower than the photopic value of the plastic, whereby the presence of the dye within the plastic is invisible to the naked eye.

6. The method of claim 4, wherein the photopic value of the plastic containing the dye is within about 10% to about 20% lower than the photopic value of the plastic, whereby the dye lends minimal coloration to the plastic and wherein the plastic containing the dye is transparent.

7. The method of claim 6, wherein the minimal coloration comprises a light pastel coloration.

8. The method of claim 1, wherein the Absorbance Ratio is calculated using a wavelength (wv) within the absorption trough and a reference wavelength (lww) in the absorption band.

9. The method of claim 1, wherein the strong transmission of light in the visible spectrum comprises a high photopic value for the dye.

10. The method of claim 1, wherein the photopic value of the plastic containing the dye is less than about 10% of the photopic value of the plastic, whereby the presence of the dye within the plastic is invisible to the naked eye.

11. The method of claim 1, wherein the photopic value of the plastic containing the dye is within about 10% to about 20% of the photopic value of the plastic, whereby the dye lends minimal coloration to the plastic and wherein the plastic containing the dye is transparent.

12. The method of claim 1, wherein the reference wavelength is a wavelength above about 350 nm.

13. The method of claim 1, wherein the reference wavelength is a wavelength within the absorption band.

14. The method of claim 1, wherein the reference wavelength is the laser wavelength.

* * * * *